(12) United States Patent
Randall et al.

(10) Patent No.: US 8,058,357 B2
(45) Date of Patent: Nov. 15, 2011

(54) VULCANIZABLE COMPOSITIONS AND TIRE TREADS PREPARED THEREWITH

(75) Inventors: Amy Randall, Akron, OH (US); Terrence E. Hogan, Akron, OH (US); William L. Hergenrother, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 339 days.

(21) Appl. No.: 12/347,762

(22) Filed: Dec. 31, 2008

(65) Prior Publication Data

US 2010/0000639 A1 Jan. 7, 2010

Related U.S. Application Data

(60) Provisional application No. 61/018,074, filed on Dec. 31, 2007.

(51) Int. Cl.
*C08C 19/20* (2006.01)
*C08F 8/34* (2006.01)

(52) U.S. Cl. .............. 525/351; 525/343; 525/332.6; 525/331.9; 525/332.4

(58) Field of Classification Search .............. 524/543, 524/588, 599; 535/105; 525/343, 351, 332.6, 525/331.9, 332.4
See application file for complete search history.

(56) References Cited

U.S. PATENT DOCUMENTS

| | | | |
|---|---|---|---|
| 4,485,833 | A | 12/1984 | Uraneck et al. |
| 5,268,439 | A | 12/1993 | Hergenrother et al. |
| 6,008,295 | A | 12/1999 | Takeichi et al. |
| 6,080,853 | A | 6/2000 | Corrigan et al. |
| 6,228,908 | B1 | 5/2001 | Takeichi et al. |
| 6,596,798 | B1 | 7/2003 | Rademacher et al. |
| 6,838,538 | B2 | 1/2005 | Toyoizumi et al. |
| 7,342,070 | B2 | 3/2008 | Tsukimawashi et al. |
| 7,427,651 | B2 | 9/2008 | Shibata et al. |
| 2002/0036043 | A1* | 3/2002 | Victor Thielen .............. 152/517 |
| 2007/0088132 | A1 | 4/2007 | Taniguchi et al. |
| 2007/0185267 | A1 | 8/2007 | Kobayashi et al. |
| 2007/0299197 | A1* | 12/2007 | Lin et al. ........................ 524/543 |
| 2008/0295935 | A1 | 12/2008 | Kobayashi et al. |

FOREIGN PATENT DOCUMENTS

| WO | WO 2004/020475 A1 | 3/2004 |
|---|---|---|
| WO | WO 2004/041870 A2 | 5/2004 |
| WO | WO 2008/156788 A2 | 12/2008 |

* cited by examiner

*Primary Examiner* — Ling Choi
(74) *Attorney, Agent, or Firm* — Meredith E. Hooker; Arthur M. Reginelli

(57) ABSTRACT

A method for preparing a tire tread, the method comprising vulcanizing a vulcanizable composition comprising a rubber component including a functionalized polymer and a cure system, where the cure system includes sulfur and a disulfide compound represented by the formula I $$R^1-S-S-R^3-S-S-R^2$$

where $R^3$ represents a divalent organic group and $R^1$ and $R^2$ each independently include a monovalent organic group including a nitrogen atom.

40 Claims, No Drawings

VULCANIZABLE COMPOSITIONS AND TIRE TREADS PREPARED THEREWITH

This application claims the benefit of U.S. Provisional Patent Application Ser. No. 61/018,074, filed on Dec. 31, 2007, which is incorporated herein by reference.

FIELD OF THE INVENTION

One or more embodiments of the present invention relate to tire components, particularly tire treads, that are prepared from rubber compositions that include functionalized polymer and a cure system including sulfur and disulfide.

BACKGROUND OF THE INVENTION

In the art of making tires, it is desirable to construct tires having tire treads with resistance to wear. As those skilled in the art appreciate, however, technologically useful tires require an overall balance of properties that are often interrelated.

U.S. Publ. No. 2002/0036043 discloses runflat tires including an insert in the sidewall. The insert includes a rubbery polymer and 1,6-bis(N,N'-dibenzylthiocarbamoyldithio)-hexane. The 1,6-bis(N,N'-dibenzylthiocarbamoyldithio)-hexane inhibits thermal degradation and provides runflat tires with extended service life.

SUMMARY OF THE INVENTION

One or more embodiments of the present invention provide a method for preparing a tire tread, the method comprising vulcanizing a vulcanizable composition comprising a rubber component including a functional polymer; and a cure system, where the cure system includes sulfur and a disulfide compound represented by the formula I

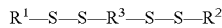

where $R^3$ represents a divalent organic group and $R^1$ and $R^2$ each independently include a monovalent organic group including a nitrogen atom.

Other embodiments provide a tire including a tire tread including the vulcanization residue of a functionalized polymer, sulfur, and a disulfide compound represented by the formula I

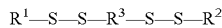

where $R^3$ represents a divalent organic group and $R^1$ and $R^2$ each independently include a monovalent organic group including a nitrogen atom.

Yet other embodiments provide a tire tread cured with sulfur and a disulfide compound represented by the formula I

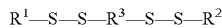

where $R^3$ represents a divalent organic group and $R^1$ and $R^2$ each independently include a monovalent organic group including a nitrogen atom, where the tire tread includes a functionalized polymer.

DETAILED DESCRIPTION OF ILLUSTRATIVE EMBODIMENTS

One or more embodiments of the present invention are directed toward tire treads prepared from vulcanizable compositions including a functionalized polymer (which may also be referred to as a functionalized polymer) and a cure system that includes sulfur and a disulfide.

In one or more embodiments, the disulfide, which may also be referred to as a bis-sulfide, may be represented by the formula (I):

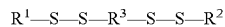

where $R^3$ represents a divalent organic group, and $R^1$ and $R^2$ each independently represent a monovalent organic group.

In one or more embodiments, monovalent organic groups may include hydrocarbyl groups or substituted hydrocarbyl groups such as, but not limited to, alkyl, cycloalkyl, alkenyl, cycloalkenyl, aryl, allyl, aralkyl, alkaryl, or alkynyl groups. Substituted hydrocarbyl groups include hydrocarbyl groups in which one or more hydrogen atoms have been replaced by a substituent such as an alkyl group. In one or more embodiments, these groups may include from one, or the appropriate minimum number of carbon atoms to form the group, to 20 carbon atoms. These groups may also contain heteroatoms such as, but not limited to, nitrogen, boron, oxygen, silicon, sulfur, tin, and phosphorus atoms.

In one or more embodiments, divalent organic groups may include hydrocarbylene groups or substituted hydrocarbylene groups such as, but not limited to, alkylene, cycloalkylene, alkenylene, cycloalkenylene, alkynylene, cycloalkynylene, or arylene groups. Substituted hydrocarbylene groups include hydrocarbylene groups in which one or more hydrogen atoms have been replaced by a substituent such as an alkyl group. In one or more embodiments, these groups may include two, or the appropriate minimum number of carbon atoms to form the group, to 20 carbon atoms. These groups may also contain one or more heteroatoms such as, but not limited to, nitrogen, oxygen, boron, silicon, sulfur, tin, and phosphorus atoms.

In particular embodiments, at least one of $R^1$ and $R^2$ include a nitrogen atom. In these or other embodiments, $R^3$ includes an alkylene group including from 2 to about 10 carbon atoms. The alkylene group may be any of a linear group, a branched group and a cyclic group. Examples of the linear alkylene group having 2 to 10 carbon atoms include ethylene group, trimethylene group, tetramethylene group, pentamethylene group, hexamethylene group, heptamethylene group, octamethylene group and decamethylene group.

In particular embodiments, $R^1$ and $R^2$ each represent a monovalent organic group having a nitrogen atom, and may include a monovalent organic group having at least one aromatic ring and a nitrogen atom. In other embodiments, $R^1$ and $R^2$ each represent a group having a carbon atom bonded to dithio group, which can be expressed as =N—(C=S)—. In one or more embodiments, $R^1$ and $R^2$ may represent the same group or different groups.

Examples of the compound represented by general formula (I) include α,ω,bis(N,N'-dihydrocarbylthiocarbamoyldithio) alkanes, which may be represented by general formula (I-a):

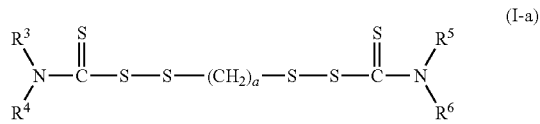

where $R^3$, $R^4$, $R^5$, and $R^6$ each independently represent a monovalent organic group, where at least one of $R^3$ and $R^4$ and at least one of $R^5$ and $R^6$ is an aromatic group, and n represents an integer from 2 to about 10. In one or more embodiments, $R^3$ to $R^6$ each represent an alkyl group, an aryl group or an aralkyl group where at least one of $R^3$ and $R^4$ and at least one of $R^5$ and $R^6$ represents an aryl group or an aralkyl group, and n represents an integer of 2 to 10.

The alkyl group may include from 1 to 20 carbon atoms. The alkyl group may be a linear group, a branched group or a cyclic group. Examples of the alkyl group include methyl group, ethyl group, n-propyl group, isopropyl group, n-butyl group, isobutyl group, sec-butyl group, tert-butyl group, various types of pentyl group, various types of hexyl group, various types of octyl group, various types of decyl group, various types of dodecyl group, various types of tetradecyl group, various types of hexadecyl group, various types of octadecyl group, cyclopentyl group, cyclohexyl group and cyclooctyl group.

The aryl group may include 6 to 20 carbon atoms. The aryl group may have a suitable substituent such as a lower alkyl group on the ring. Examples of the aryl group include phenyl group, tolyl group, xylyl group, naphthyl group and methylnaphthyl group. In particular embodiments, the aralkyl groups may have 7 to 20 carbon atoms. The aralkyl group may have a suitable substituent such as a lower alkyl group on the ring. Examples of the aralkyl group include benzyl group, methylbenzyl group, dimethylbenzyl group, phenyl group, methylphenyl group, dimethylphenyl group, naphthylmethyl group, (methylnaphthyl)methyl group, (dimethylnaphthyl) methyl group, naphthylethyl group, (methylnaphthyl)ethyl group and (dimethylnaphthyl)ethyl group. In one or more embodiments, $R^3$ to $R^6$ all represent the aryl group or the aralkyl group described above and may represent a benzyl group.

Examples of disulfide compounds useful in the practice of the present invention include, but are not limited to, 1,2-bis (N,N'-dibenzylthiocarbamoyldithio)ethane, 1,3-bis(N,N'-dibenzylthiocarbamoyldithio)propane, 1,4-bis(N,N'-dibenzylthiocarbamoyldithio)butane, 1,5-bis(N,N'-dibenzylthiocarbamoyldithio)pentane, 1,6-bis(N,N'-dibenzylthiocarbamoyldithio)hexane, 1,7-bis(N,N'-dibenzylthiocarbamoyldithio)-heptane, 1,8-bis(N,N'-dibenzylthiocarbainoyldithio)octane, 1,9-bis(N,N'-dibenzylthiocarbamoyldithio)nonane and 1,10-bis(N,N'-dibenzylthiocarbamoyldithio)decane.

In one or more embodiments, functionalized polymers may include any synthetic or natural rubber including a functional group. Functional groups may be introduced during initiation and/or termination of polymerization, during chain transfer, or during post-polymerization modification. The functionalized polymer may include one or more functional groups at or near one or both termini, or along the backbone of the polymer.

The polymer to which the functional group is attached may include a rubbery polymer as described above. The functional group may be tethered or attached to the polymer at the head and/or tail of the polymer (which may be referred to as the polymer chain or polymer backbone), and in certain embodiments may be pendant to the polymer chain. Functional polymers may include multiple functional groups including head and tail functionalization. As those skilled in the art appreciate, head functionalization refers to the presence of a functional group at or near the location of initiation of the polymer, and tail functionalization refers to the presence of a functional group at or near the location of termination of the polymer.

In one or more embodiments, functional groups include those substituents that reduce the 50° C. hysteresis loss of a carbon black-filled vulcanizate as compared to similar carbon black-filled vulcanizates without the functional group. In one or more embodiments, this reduction in hysteresis loss is at least 5%, in other embodiments at least 10%, and in other embodiments at least 15%. In other embodiments, functional groups include those groups that will have a similar impact on silica-filled or mixed carbon black/silica-filled compositions.

In one or more embodiments, the functional groups include a hetero atom. These hetero atom-bearing substituents include those that may generally be characterized as an electron rich species or metal-containing species. Functional groups include those substituents that react or interact with rubber or rubber fillers or otherwise have a desirable impact on filled rubber compositions or vulcanizates.

In one or more embodiments, the functional groups include amine groups, amide groups, oxime groups, hydrazine groups, nitrile groups, hydroxyl groups, alkoxyl groups, thiol groups, carboxyl groups, urea groups, urethane groups, sulfanyl groups, phosphoryl groups, silyl groups, or tin groups, as well as combinations thereof.

Numerous functional groups are known in the art. Exemplary functional groups include tin-containing groups, nitrogen-containing groups, boron-containing groups, oxygen-containing groups, phosphorous-containing groups, silicon-containing groups, amino-alkoxy silane groups, and sulfur-containing groups. Exemplary tin-containing groups include trialkyltin groups such as tributyl tin and trioctyltin groups. Exemplary nitrogen-containing groups include cyclic amine groups such as hexamethyleneimine groups, pyrollidine groups, and aziridine groups. Other exemplary nitrogen-containing groups include amine groups such as primary or secondary amine groups. Still other nitrogen-containing groups include amide groups. Exemplary sulfur-containing groups include sulfur-containing azaheterocycle groups, and dithiane groups. Exemplary oxygen-containing groups include carbonyl-containing groups and oxygen-containing azaheterocycle groups. Exemplary silicon-containing groups include alkoxy silyl groups.

Exemplary phosphorous-containing functionalized polymers are disclosed in U.S. Pat. No. 4,485,833; exemplary oxygen-containing azaheterocycle functionalized polymers are disclosed in U.S. Pat. No. 6,596,798; exemplary oxygen-containing and sulfur-containing heterocycle functionalized polymers are disclosed in International Publication No. WO 2004/020475; exemplary trialkyl tin substituent functionalized polymers are disclosed in U.S. Pat. No. 5,268,439; exemplary cyclic amine functionalized polymers are disclosed in U.S. Pat. No. 6,080,853; exemplary aryl or alkyl thio acetal (e.g., dithianes) functionalized polymers are disclosed in International Publication No. WO 2004/041870, all of which are incorporated herein by reference. Exemplary silicon-containing functionalized polymers are disclosed in U.S. Pat. Nos. 6,008,295 and 6,228,908, and U.S. Provisional Application No. 60/565,723, which are incorporated herein by reference. Exemplary functionalized polymers containing an amino-alkoxy silane groups include U.S. Publication Nos. 2007/0088132, 2007/0185267, 2007/0265397, and 2007/0295935, which are incorporated herein by reference, U.S. Pat. Nos. 7,342,070 and 6,838,538, which are incorporated herein by reference, as well as WO 2008/156788, which is incorporated herein by reference.

In one or more embodiments, the polymer backbone or chain (i.e. the polymer to which the functional group is attached) is an elastomer, which is a polymer that is capable of being vulcanized to form vulcanizates exhibiting elastomeric properties. In one or more embodiments, the elastomers are unsaturated. In one or more embodiments, the elastomers have a glass transitions temperature (Tg) of less than 20° C., in other embodiments less than 10° C., in other embodiments less than 0° C., in other embodiments less than −10° C., in other embodiments less than −20° C., and in other embodiments less than −30° C. In one or more embodiments, the elastomers are linear molecules. In other embodiments, the polymers are substantially linear or only include limited branching.

In one or more embodiments, the elastomers may derive from the polymerization of conjugated diene monomers. These conjugated diene monomers may be copolymerized with other monomers such as vinyl aromatic monomers. Other rubbery elastomers may derive from the polymerization of ethylene together with one or more α-olefins and optionally one or more diene monomers. Examples of synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped.

In one or more embodiments, useful elastomers may have a number average molecular weight (Mn) of less than 500 kg/mol, in other embodiments less than 400 kg/mol, in other embodiments less than 300 kg/mol, in other embodiments less than 250 kg/mol, in other embodiments less than 200 kg/mol, in other embodiments less than 150 kg/mol, and in other embodiments less than 125 kg/mol. In these or other embodiments, the elastomers may have a number average molecular weight of at least 25 kg/mol, in other embodiments at least 50 kg/mol, in other embodiments at least 75 kg/mol, in other embodiments at least 100 kg/mol. In these or other embodiments, the molecular weight distribution of the elastomers (Mn/Mw) of less than 5.5, in other embodiments less than 4.5, in other embodiments less than 4.0, in other embodiments less than 3.5, in other embodiments less than 2.5, and in other embodiments less than 2.0. As is known in the art, Mn (number average molecular weight) and Mw (weight average molecular weight) may be determined by using gel permeation chromatography (GPC) calibrated with polystyrene standards and adjusted for the Mark-Houwink constants for the polymer in question.

In one or more embodiments, the polymer chain is a homopolymer, and in other embodiments the polymer chain is a copolymer, which refers to a polymer having two or more chemically distinct mer units. In one or more embodiments, the mer units of the polymer derived from diene may be cis, trans, or vinyl.

In particular embodiments, the polymer chain is a polydiene having a cis-1,4-linkage content that is greater than about 60%, in other embodiments greater than about 75%, in other embodiments greater than about 90%, and in other embodiments greater than about 95%. Also, these polymers may have a 1,2-linkage content (i.e. vinyl content) that is less than about 7%, in other embodiments less than 5%, in other embodiments less than 2%, and in other embodiments less than 1%. The cis-1,4- and 1,2-linkage contents can be determined by infrared spectroscopy. The number average molecular weight ($M_n$) of these polydienes may be from about 5,000 to about 200,000, in other embodiments from about 25,000 to about 150,000, and in other embodiments from about 50,000 to about 120,000, as determined by using gel permeation chromatography (GPC) calibrated with polystyrene standards and Mark-Houwink constants for the polymer in question. The polydispersity of these polydienes may be from about 1.5 to about 5.0, and in other embodiments from about 2.0 to about 4.0. Exemplary high cis-polydienes include cis-1,4-polybutadiene, cis-1,4-polyisoprene, and cis-1,4-poly(butadiene-co-isoprene).

In one or more embodiments, the polymer chain is a medium or low cis polydiene (or polydiene copolymer) including those prepared by anionic polymerization techniques. These polydienes can have a cis content of from about 10% to about 70%, in other embodiments from about 15% to about 60%, and in other embodiments from about 20% to about 50%, where the percentages are based upon the number of diene mer units in the cis configuration versus the total number of diene mer units. These polydienes may also have a 1,2-linkage content (i.e. vinyl content) from about 10% to about 60%, in other embodiments from about 15% to about 50%, and in other embodiments from about 20% to about 45%, where the percentages are based upon the number of diene mer units in the vinyl configuration versus the total number of diene mer units. The balance of the diene units may be in the trans-1,4-linkage configuration.

In particular embodiments, the elastomers include a random copolymer of butadiene, styrene, and optionally isoprene. In other embodiments, the elastomer is a block copolymer of polybutadiene, polystyrene, and optionally polyisoprene. In particular embodiments, the elastomer is hydrogenated or partially hydrogenated.

In one or more embodiments, the polymer chain is a copolymer wherein less than 70%, in other embodiments less than 50%, in other embodiments less than 30%, in other embodiments less than 28%, in other embodiments less than 26%, in other embodiments less than 24%, in other embodiments less than 20%, and in other embodiments less than 18% of the diene units are in the vinyl or 1,2 microstructure. In these or other embodiments, the polymer chain is a copolymer wherein greater than 5%, and in other embodiments greater than 10% of the diene mer units are in the vinyl or 1,2 microstructure.

In these or other embodiments, the polymer chain is a copolymer including at least 10%, in other embodiments at least 15%, in other embodiments at least 20%, in other embodiments at least 25%, in other embodiments at least 30%, and in other embodiments at least 40% (on a mole basis) styrene units (i.e., units deriving from the polymerization of styrene). In these or other embodiments, the polymer chain is a copolymer including less than 60% and in other embodiments less than 50% (on a mole basis) styrene mer units. In one or more embodiments, the polymer chain is a homopolymer of conjugated diene, such as polybutadiene, which includes no units deriving from vinyl aromatic monomer or only insubstantial amount of units deriving from vinyl aromatic monomer.

In one or more embodiments, a functionalized polymer employed in practicing the present invention may be defined by the formula

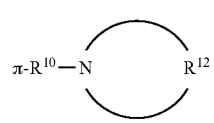

where $R^{10}$ and $R^{12}$ are each independently a divalent organic group, and π is a polymer chain.

In one or more embodiments, a functionalized polymer employed in practicing the present invention may be defined by the formula

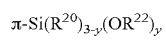

where π is a polymer chain, each $R^{20}$ is independently a halogen or a monovalent organic group, each $R^{22}$ is independently a monovalent organic group, and y is an integer from 1 to 3.

In one or more embodiments, a functionalized polymer employed in p formula:

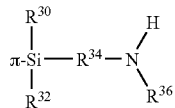

where $R^{30}$ includes a monovalent organic group or a hydrocarbyloxy group, $R^{32}$ includes a monovalent organic group, a hydroxy group, a halogen atom, or a hydrocarbyloxy group, where $R^{34}$ includes a covalent bond or a divalent organic group, and $R^{36}$ includes a hydrogen atom or a monovalent organic group, and where π is a polymer chain.

In one or more embodiments, the functionalized polymers may be prepared by initiating the anionic polymerization of conjugated diene monomer (optionally together with vinyl aromatic monomer) with an initiator bearing one or more functional groups (i.e., a functional initiator). In these or other embodiments, the functionalized polymer may be prepared by terminating living polymers, prepared from conjugated diene monomers optionally together with vinyl aromatic monomer, with a terminating agent bearing one or more functional groups (i.e., a functional terminator). In one or more embodiments, both a functional initiator and a functional terminator may be employed. Many functional initiators and functional terminators are known in the art. Exemplary functional initiators are disclosed in U.S. Pat. Nos. 5,332,810, 5,329,005, 5,578,542, 5,393,721, 5,698,646, 5,491,230, 5,521,309, 5,496,940, 5,574,109, 5,786,441, U.S. patent application Ser. Nos. 60/683,231, 60/683,152, and 10/533,408, and International Publication Nos. WO 2004/020475 and WO 2004/041870, which are incorporated herein by reference. Exemplary functional terminators are disclosed in U.S. Pat. Nos. 3,109,871, 3,135,716, 5,332,810, 5,109,907, 5,210,145, 5,227,431, 5,329,005, 5,935,893, 4,519,431, 4,540,744, 4,603,722, 5,248,722, 5,349,024, 5,502,129, 5,877,336, 786,441, 5,916,976 5,552,473, 5,786,441, 5,916, 976 5,552,473, 4,677,165, 5,219,942, 5,902,856, 4,616,069, 4,929,679, 5,115,035, 6,359,167, 6,596,798, International Publication No. WO 2004/020475, and U.S. Ser. Nos. 60/644,164, 60/591,065, 60/622,188, 60/624,347 and 60/643,653, which are incorporated herein by reference.

Anionically-polymerized living polymers may be formed by reacting anionic initiators with certain unsaturated monomers to propagate a polymeric structure. Throughout formation and propagation of the polymer, the polymeric structure may be anionic and "living." A new batch of monomer subsequently added to the reaction can add to the living ends of the existing chains and increase the degree of polymerization. A living polymer, therefore, includes a polymeric segment having a living or reactive end. Anionic polymerization is further described in George Odian, *Principles of Polymerization*, ch. 5 (3$^{rd}$ Ed. 1991), or Panek 94 J. Am. Chem. Soc., 8768 (1972), which are incorporated herein by reference.

Monomers that can be employed in preparing an anionically polymerized living polymer include any monomer capable of being polymerized according to anionic polymerization techniques. These monomers include those that lead to the formation of elastomeric homopolymers or copolymers. Suitable monomers include, without limitation, conjugated $C_4$-$C_{12}$ dienes, $C_8$-$C_{18}$ monovinyl aromatic monomers, and $C_6$-$C_{20}$ trienes. Examples of conjugated diene monomers include, without limitation, 1,3-butadiene, isoprene, 1,3-pentadiene, 2,3-dimethyl-1,3-butadiene, and 1,3-hexadiene. A non-limiting example of trienes includes myrcene. Aromatic vinyl monomers include, without limitation, styrene, α-methyl styrene, p-methylstyrene, and vinylnaphthalene. When preparing elastomeric copolymers, such as those containing conjugated diene monomers and aromatic vinyl monomers, the conjugated diene monomers and aromatic vinyl monomers are normally used at a ratio of 95:5 to 50:50, and preferably 95:5 to 65:35.

Any anionic initiator can be employed to initiate the formation and propagation of the living polymers. Exemplary anionic initiators include, but are not limited to, alkyl lithium initiators such as n-butyl lithium, arenyllithium initiators, arenylsodium initiators, aminoalkyllithiums, and alkyl tin lithiums. Other useful initiators include N-lithiohexamethyleneimide, N-lithiopyrrolidinide, and N-lithiododecamethyleneimide as well as organolithium compounds such as the tri-alkyl lithium adducts of substituted aldimines and substituted ketimines, and N-lithio salts of substituted secondary amines. Still others include alkylthioacetals (e.g., dithianes). Exemplary initiators are also described in the following U.S. Pat. Nos. 5,332,810, 5,329,005, 5,578,542, 5,393,721, 5,698, 646, 5,491,230, 5,521,309, 5,496,940, 5,574,109, 5,786,441, and International Publication Nos. WO 2004/020475 and WO 2004/041870, which are incorporated herein by reference.

The amount of initiator employed in conducting anionic polymerizations can vary widely based upon the desired polymer characteristics. In one or more embodiments, from about 0.1 to about 100, and optionally from about 0.33 to about 10 mmol of lithium per 100 g of monomer is employed.

Anionic polymerizations are typically conducted as a solution polymerization in a polar solvent such as tetrahydrofuran (THF) or a nonpolar hydrocarbon such as the various cyclic and acyclic hexanes, heptanes, octanes, pentanes, their alkylated derivatives, and mixtures thereof, as well as benzene.

In order to promote randomization in copolymerization and to control vinyl content, a polar coordinator may be added to the polymerization ingredients. Amounts range between 0 and 90 or more equivalents per equivalent of lithium. The amount depends on the amount of vinyl desired, the level of styrene employed and the temperature of the polymerization, as well as the nature of the specific polar coordinator (modifier) employed. Suitable polymerization modifiers include, for example, ethers or amines to provide the desired microstructure and randomization of the comonomer units.

Compounds useful as polar coordinators include those having an oxygen or nitrogen heteroatom and a non-bonded pair of electrons. Examples include dialkyl ethers of mono and oligo alkylene glycols; "crown" ethers; tertiary amines such as tetramethylethylene diamine (TMEDA); linear THF oligomers; and the like. Specific examples of compounds useful as polar coordinators include tetrahydrofuran (THF), linear and cyclic oligomeric oxolanyl alkanes such as 2,2-bis (2'-tetrahydrofuryl)propane, di-piperidyl ethane, dipiperidyl methane, hexamethylphosphoramide, N—N'-dimethylpiperazine, diazabicyclooctane, dimethyl ether, diethyl ether, tributylamine and the like. The linear and cyclic oligomeric oxolanyl alkane modifiers are described in U.S. Pat. No. 4,429,091, incorporated herein by reference.

Anionically polymerized living polymers can be prepared by either batch or continuous methods. A batch polymerization is begun by charging a blend of monomer(s) and normal alkane solvent to a suitable reaction vessel, followed by the addition of the polar coordinator (if employed) and an initiator compound. The reactants are heated to a temperature of from about 20 to about 130° C. and the polymerization is allowed to proceed for from about 0.1 to about 24 hours. This reaction produces a reactive polymer having a reactive or living end. Preferably, at least about 30% of the polymer molecules contain a living end. More preferably, at least about 50% of the polymer molecules contain a living end. Even more preferably, at least about 80% contain a living end.

In one or more embodiments, the functionalizing agent is reacted with the living polymer end. This reaction can be achieved by simply mixing the functionalizing agent with the living polymer. The reaction may occur in solution; for example, the functionalizing agent may be added to the solution containing the living polymer. Without intending to be bound to any particular theory, it is believed that the anionic-living polymer reacts with the functionalizing agent via a nucleophilic substitution reaction.

In one embodiment, the functionalizing agent may be added to the living polymer cement (i.e., polymer and solvent) once a peak polymerization temperature, which is indicative of nearly complete monomer conversion, is observed. Because live ends may self-terminate, the functionalizing agent may be added within about 25 to 35 minutes of the peak polymerization temperature.

The amount of functionalizing agent employed to prepare the functionalized polymers is best described with respect to the equivalents of lithium or metal cation associated with the initiator. For example, where a lithium initiator is employed, the moles of functionalizing agent per mole of lithium may be about 0.3 to about 2, optionally from about 0.6 to about 1.5, optionally from about 0.7 to about 1.3, and optionally from about 0.8 to about 1.1.

In certain embodiments, the functionalizing agent can be employed in combination with other coupling or terminating agents. The combination of functionalizing agent with other terminating agent or coupling agent can be in any molar ratio. The coupling agents that can be employed in combination with the functionalizing agent include any of those coupling agents known in the art including, but not limited to, tin tetrachloride, tetraethyl ortho silicate, and tetraethoxy tin, and silicon tetrachloride. Likewise, any terminating agent can be employed in combination with the functionalizing agent (i.e., the amino chloro silane) including, but not limited to, tributyltin chloride. In certain embodiments, a proton source or quenching agent (e.g., isopropyl alcohol or water) may be added to the solution after addition of the functionalizing agent.

In other embodiments, the functionalized polymer employed in one or more embodiments of the present invention may be prepared by reacting a reactive polymer, which may also be referred to as a pseudo-living polymer, with a functionalizing agent, where the reactive polymer is prepared with a coordination catalyst system. In particular embodiments, the catalyst system is a lanthanide-based catalyst system, and the functionalized polymer is a high-cis polymer The elastomers synthesized with coordination catalyst systems, such as lanthanide-based catalyst systems, may be terminated with a coupling agent or terminating agent that will impart an end functionality to the polymer.

Useful coupling or functionalizing agents that can be used with pseudo living polymers include those described above, which are described in International Application Nos. PCT/US00/30743 and PCT/US00/30875, which are incorporated herein by reference. In one or more embodiments, suitable functionalizing agents include those compounds that may contain groups such as ketone, aldehyde, amide, ester, imidazolidinone, isocyanate, and isothiocyanate groups. Examples of these compounds are disclosed in U.S. Publication Nos. 2006/0004131 A1, 2006/0025539 A1, 2006/0030677 A1, and 2004/0147694 A1, which are incorporated herein by reference. Other examples of functionalizing agents include azine compounds as described in U.S. Ser. No. 11/640,711, hydrobenzamide compounds as disclosed in U.S. Ser. No. 11/710,713, nitro compounds as disclosed in U.S. Ser. No. 11/710,845, and protected oxime compounds as disclosed in U.S. Ser. No. 60/875,484, all of which are incorporated herein by reference. Still others are disclosed in U.S. Pat. Nos. 4,906,706, 4,990,573, 5,064,910, 5,567,784, and 5,844,050, 6,992,147, 6977,281; U.S. Publication No. 2006/0004131A1; Japanese Patent Application Nos. 05-051406A, 05-059103A, 10-306113A, and 11-035633A, which are incorporated herein by reference. Useful functionalizing agents that can be used to couple reactive polymer chains, which compounds may also be referred to as coupling agents, include any of those known in the art including, but not limited to, metal halides such as tin tetrachloride, metalloid halides such as silicon tetrachloride, ester carboxylate metal complexes such as dioctyltin bis(octylmaleate), alkoxysilanes such as tetraethyl orthosilicate, and alkoxystannanes such as tetraethoxytin. Coupling agents can be employed either alone or in combination with other functionalizing agents. The combination of functionalizing agents may be used in any molar ratio.

After formation of the functional polymer, a processing aid and other optional additives such as oil can be added to the polymer cement. The functional polymer and other optional ingredients may then be isolated from the solvent and optionally dried. Conventional procedures for desolventization and drying may be employed. In one embodiment, the functional polymer may be isolated from the solvent by steam desolventization or hot water coagulation of the solvent followed by filtration. Residual solvent may be removed by using conventional drying techniques such as oven drying or drum drying. Alternatively, the cement may be directly drum dried.

In one or more embodiments, the rubber compositions used to prepare the vulcanizates of the present invention (such as tire treads), which rubber compositions may also be referred to as vulcanizable compositions, may be prepared by mixing a rubber component with a cure system, where the rubber component includes a functionalized polymer and the cure system includes sulfur and the disulfide. Additionally, other ingredients employed in the art of making rubber compositions (e.g. fillers) can be mixed with the rubber component and the cure system.

In one or more embodiments, the rubber component includes the functionalized polymer and at least one additional vulcanizable polymer, which may be referred to as an elastomer, rubber, or non-functionalized rubber or elastomer. In one or more embodiments, elastomers include those polymers that are capable of being vulcanized to form vulcanizates exhibiting elastomeric properties. Other elastomers that may be used include natural and synthetic elastomers. The synthetic elastomers may derive from the polymerization of conjugated diene monomers. These conjugated diene monomers may be copolymerized with other monomers such as vinyl aromatic monomers. Other rubbery elastomers may derive from the polymerization of ethylene together with one or more α-olefins and optionally one or more diene monomers In one or more embodiments, the rubber compositions employed in the present invention may include from about 15 to about 100% by weight, in other embodiments from about 35 to about 90% by weight, and in other embodiments from about 50 to 80% by weight of the functionalized polymer based on the total weight of the rubber within the formulation or composition (i.e. the rubber component).

Useful rubbery elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Other ingredients that are typically employed in rubber compounding may also be added.

As noted above, the cure system includes sulfur and the disulfide disclosed above. Sulfur may include elemental sulfur or sulfur donor compounds. Curing agents are described in 20 *Kirk-Othmer, Encyclopedia of Chemical Technology*, 365-468, ($3^{rd}$ Ed. 1982), particularly *Vulcanization Agents and Auxiliary Materials*, 390-402, and A. Y. Coran, *Vulcanization in Encyclopedia of Polymer Science and Engineering*, ($2^{nd}$ Ed. 1989), which are incorporated herein by reference.

The amount of the cure system employed may be varied depending upon the desired level of cure. In one or more embodiments, the vulcanizable composition may include at least 0.5 parts by weight (pbw), in other embodiments at least 1.0 pbw, in other embodiments at least 1.5 pbw, and in other embodiments at least 2.0 pbw cure system per 100 parts by weight rubber (phr). In these or other embodiments, the vulcanizable composition may include up to 5 parts by weight (pbw), in other embodiments up to 4.5 pbw, in other embodiments up to 4.0 pbw, and in other embodiments up to 3.0 pbw cure system per 100 parts by weight rubber (phr).

In one or more embodiments, the cure system may include a weight ratio or sulfur to disulfide of at least 0.5:1, in other embodiments at least 0.7:1, and in other embodiments at least 1.1:1. In these or other embodiments, the cure system may include a weight ratio or sulfur to disulfide of up to 2:1, in other embodiments up to 1.5:1, and in other embodiments up to 1.3:1.

The rubber compositions may also include fillers such as inorganic and organic fillers. The organic fillers include carbon black and starch. The inorganic fillers may include silica, aluminum hydroxide, magnesium hydroxide, clays (hydrated aluminum silicates), and mixtures thereof. In one embodiment, the total amount of filler employed is typically from about 1 to about 100 parts by weight (pbw) per 100 parts by weight rubber (phr), in another embodiment, from about 20 to about 90 pbw filler phr, and in yet another embodiment from about 40 to about 80 pbw filler phr.

Useful silica (silicon dioxide) includes wet-process silica. These may include hydrated silica produced by a chemical reaction in water, and precipitated as ultra-fine spherical particles. In one embodiment, silicas have a surface area, as measured by the BET method, of about 32 to about 400 $m^2/g$, in another embodiment about 100 to about 250 $m^2/g$, and in yet another embodiment about 150 to about 220 $m^2/g$. In certain embodiments the pH of the silica filler is about 5.5 to about 7 and preferably about 5.5 to about 6.8. Commercially available silicas include Hi-Sil™ 215, Hi-Sil™ 233, Hi-Sil™ 255LD, and Hi-Sil™ 190 (PPG Industries; Pittsburgh, Pa.), Zeosil™ 1165MP and 175GRPlus (Rhodia), Vulkasil™ S/kg (Bary AG), Ultrasil™ VN2, VN3 (Degussa), and HuberSil™ 8745 (Huber).

In one or more embodiments, silica may be used in an amount from about 5 to about 100 parts by weight phr, in one embodiment from about 10 to about 90 parts by weight phr, in another embodiment from about 15 to about 85 parts by weight phr, and in yet another embodiment from about 25 to about 75 parts by weight phr.

Useful carbon black includes any commonly available carbon black. In one embodiment, the carbon black has a surface area (EMSA) of at least 20 $m^2/g$, and in another embodiment, the surface area is at least 35 $m^2/g$ up to 200 $m^2/g$ or higher. Surface area values used in this application are those determined by ASTM test D-1765 by using the cetyltrimethylammonium bromide (CTAB) technique.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

In one embodiment, an initial masterbatch is prepared by mixing the elastomer and filler. This initial masterbatch may be mixed at a starting temperature from about 25° C. to about 125° C. with a discharge temperature of about 135° C. to about 180° C. Scorch inhibiting agents may also be added to this initial masterbatch. Once this initial masterbatch is processed, the vulcanizing agents (i.e the cure system including sulfur and disulfide) can be introduced and mixing continued at relatively low temperatures so as to inhibit or discourage vulcanization. The low temperature mixing of the vulcanizing agents is typically referred to as the final mix stage. Optionally, additional mixing stages, sometimes called remill, can be employed between the initial masterbatch and the final mix stage.

In one or more embodiments, where silica is employed as a filler (alone or in combination with other fillers), a coupling and/or shielding agent may be added to the rubber formulation during mixing. Useful coupling and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference. In one embodiment, the initial masterbatch is prepared by including the functionalized polymer of this invention and silica in the substantial absence of coupling and shielding agents. It is believed that this procedure will enhance the opportunity that the functionalized polymer will react or interact with silica before competing with coupling or shielding agents, which can be added later curing remills.

Rubber compounding techniques and the additives employed therein are generally known as disclosed in Stephens, *The Compounding and Vulcanization of Rubber*, in *Rubber Technology* ($2^{nd}$ Ed. 1973). The mixing conditions and procedures applicable to silica-filled tire formulations are also well known as described in U.S. Pat. Nos. 5,227,425, 5,719,207, 5,717,022, and European Patent No. 890,606, all of which are incorporated herein by reference.

The rubber compositions of the present invention may be fabricated into numerous cured articles. In one or more embodiments, the rubber compositions are employed to prepare tire components such as treads, subtreads, black sidewalls, body ply skins, bead filler, and the like. It is believed that the rubber compositions are particularly advantageous for the preparation of tire treads. In one or more embodiments, the preparation of vulcanizable compositions and the construction and curing of the tire is not affected by the practice of this invention. In general, the rubber compositions are molded or fabricated into green tire components. A green tire is prepared by employing the green tire components. The green tire is then cured into a tire.

Where the vulcanizable rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140 to about 180° C. Cured or crosslinked rubber compositions may be referred to as vulcanizates, which generally contain three-dimensional polymeric networks that are thermoset. Other ingredients, such as processing aids and fillers, as well as the fibers described in this invention, are generally dispersed throughout the vulcanized network.

Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

Four polymers were prepared and formulated into rubber formulations of the type employed to prepare treads for pneumatic tires. In particular, three rubber formulations were prepared including (i) an all carbon black filler system, (ii) a mixed carbon black and silica filler system, and (iii) an all silica filler system. Vulcanizates from the rubber formulations were analyzed for wear properties both before and after aging.

The polymers had the following characteristics. Polymer I was an anionically-polymerized styrene-butadiene random copolymer characterized by a Mooney viscosity ($ML_{1+4}$@100° C.) of about 55, contained about 24% bound styrene, and about 13% of the butadiene mer units were in the vinyl configuration. Polymer I was unfunctionalized inasmuch as it was initiated with an n-butyl lithium initiator, was terminated with isopropyl alcohol, and no coupling agent was added to the reactive polymer.

Polymer II was an anionically-polymerized styrene-butadiene random copolymer characterized by a Mooney viscosity ($ML_{1+4}$@100° C.) of about 90, contained about 25% bound styrene, and about 43% of the butadiene mer units were in the vinyl configuration. Polymer II was initiated with n-butyl lithium in solution and after about 95% conversion of monomer, the reactive polymer was functionalized by introducing about 0.8 mole of hexamethyleneimine, and the reactive polymer was quenched and coupled by employing 0.2 mole of tin tetrachloride per mole of n-butyl lithium.

Polymer III was an anionically-polymerized styrene-butadiene random copolymer characterized by a Mooney viscosity ($ML_{1+4}$@100° C.) of about 73, contained about 20% bound styrene, and about 55% of the butadiene mer units were in the vinyl configuration. Polymer III was initiated with n-butyl lithium in solution and after about 95% conversion of monomer, the reactive polymer was functionalized by introducing about 0.9 mole of tetraethylorthosilicate per mole of n-butyl lithium.

Polymer IV was an anionically-polymerized styrene-butadiene random copolymer characterized by a Mooney viscosity ($ML_{1+4}$@100° C.) of about 45, contained about 20% bound styrene, and about 60% of the butadiene mer units were in the vinyl configuration. Polymer IV was initiated with n-butyl lithium in solution and after about 95% conversion of monomer, the reactive polymer was functionalized by introducing about 0.2 mole of tintetrachloride per mole of n-butyl lithium and 0.8 mole of N,N-bis(trimethylsilyl)-3-aminopropylmethyldiethoxysilane per mole of n-butyl lithium. Prior to isolating the polymer, the quenched solution containing the polymer was treated with titanium (IV) 2-ethylhexyl oxide as a condensation catalyst.

Table I provides the recipe (in parts by weight) and mixing order for each of the three rubber formulations that were employed. Table Ia provides the results of testing on the samples prepared with an all carbon black filler system, Table IIb provides the results of testing on the samples prepared with a mixed carbon black/silica filler system, and Table IIc provides the results of testing on the samples prepared with an all silica filler system. As shown in Table I, 1,6-bis(N,N-dibenzylthiocarbamoyldithio)-hexane, which was obtained under the tradename VULCUREN (Lanxess), was employed and the amount was varied as shown in Tables IIa-IIc below. The amount of sulfur added in each sample was likewise varied to account for the sulfur introduced through the disulfide. The amount of sulfur used in each sample is provided in Table II below.

TABLE I

| Samples | All Carbon Black | Mixed Carbon Black and Silica | All Silica |
|---|---|---|---|
| Masterbatch | | | |
| Polymer | 100 | 100 | 100 |
| Natural Rubber | — | — | 20 |
| Carbon Black (N343) | 50 | 27 | — |
| Silica | — | 24.5 | 52.5 |
| Black Oil | 10 | 10 | 10 |
| Stearic Acid | 2 | 2 | 2 |
| Wax | 2 | 2 | 2 |
| Antioxidant (6PPD) | 0.95 | 0.95 | 0.95 |
| Remill | | | |
| Silica | — | 2.5 | 2.5 |
| Silane | — | 2.5 | 5 |
| Final | | | |
| Sulfur | Variable | Variable | Variable |
| Vulcuren | Variable | Variable | Variable |
| TBBS | 0.5 | 0.6 | 0.7 |
| MBTS | 0.5 | 1.2 | 2 |
| DPG | 0.3 | 0.7 | 1.4 |
| Zinc Oxide | 2.5 | 2.5 | 2.5 |

The mixed formulations were fabricated into the appropriate test specimens and cured at 171° C. for 15 minutes within a compression mold. The cured samples were then analyzed for wear according to the following analysis, which employed a Lambourn wear analyzer. The test procedure, which may be referred to as a Lambourn test or Lambourn 65% slip multipoint test, was performed by initially weighing a sample of vulcanized rubber. The sample was then worn on the Lambourn wheel, which was covered in a fine mesh sand paper. This was performed for 25 seconds at a 65% slip condition (i.e. the slip variance between the wheel housing the abrasive paper and the wheel housing the sample. The sample was brushed free of any loose dust particulates and the sample weight was taken again and recorded. The sample was worn a total of three times using similar conditions and a final weight was taken after each abrasion. Three rubber samples were tested for each compound. The sample loss versus wearing time was plotted and the slope calculated for each sample. The average slope of all three compounds was then taken. A ratio of average slope for the control (0phr Vulcuren) to the average slope of the experimental sample was calculated and multiplied by 100 to provide the index, which is reported in the Table. A positive increase in the index is indicative of an improvement in wear.

Also, samples were aged at 100° C. for 48 hours. After aging, the samples were again analyzed for wear according to the Lanbourn wear analysis. The results of the Lanbourn tests were indexed and the results have been tabulated in Tables IIa-IIc.

TABLE IIa

All Carbon Black Formulations

| Sample | Polymer | Vulcuren | Sulfur | Lambourne Index | % Change (+/−) | Lambourne Index aged | % Change (+/−) |
|---|---|---|---|---|---|---|---|
| 1 | I | 0.0 | 1.5 | 100 | 0 | 75 | 0 |
| 2 | I | 0.5 | 1.0 | 94 | −6 | 77 | 3 |
| 3 | I | 1.0 | 0.5 | 87 | −13 | 73 | −3 |
| 4 | II | 0.0 | 1.5 | 100 | 0 | 95 | 0 |
| 5 | II | 0.5 | 1.0 | 95 | −5 | 100 | 5 |
| 6 | II | 1.0 | 0.5 | 97 | −3 | 106 | 11 |
| 7 | III | 0.0 | 1.5 | 100 | 0 | 92 | 0 |
| 8 | III | 0.5 | 1.0 | 99 | −1 | 99 | 8 |
| 9 | III | 1.0 | 0.5 | 103 | 3 | 111 | 22 |
| 10 | IV | 0.0 | 1.5 | 100 | 0 | 80 | 0 |
| 11 | IV | 0.5 | 1.0 | 99 | −1 | 85 | 7 |
| 12 | IV | 1.0 | 0.5 | 102 | 2 | 93 | 17 |

TABLE IIb

Mixed Carbon Black and Silica Formulation

| 13 | I | 0.0 | 1.5 | 100 | 0 | 80 | 0 |
|---|---|---|---|---|---|---|---|
| 14 | I | 0.5 | 1.0 | 99 | −1 | 78 | −2 |
| 15 | I | 1.0 | 0.5 | 100 | 0 | 82 | 3 |
| 16 | II | 0.0 | 1.5 | 100 | 0 | 106 | 0 |
| 17 | II | 0.5 | 1.0 | 103 | 3 | 113 | 6 |
| 18 | II | 1.0 | 0.5 | 112 | 12 | 122 | 15 |
| 19 | III | 0.0 | 1.5 | 100 | 0 | 105 | 0 |
| 20 | III | 0.5 | 1.0 | 103 | 3 | 113 | 7 |
| 21 | III | 1.0 | 0.5 | 107 | 7 | 120 | 14 |
| 22 | IV | 0.0 | 1.5 | 100 | 0 | 87 | 0 |
| 23 | IV | 0.5 | 1.0 | 104 | 4 | 93 | 7 |
| 24 | IV | 1.0 | 0.5 | 110 | 10 | 97 | 12 |

TABLE IIc

All Silica Formulation

| 25 | I | 0.0 | 1.5 | 100 | 0 | 73 | 0 |
|---|---|---|---|---|---|---|---|
| 26 | I | 0.5 | 1.0 | 101 | 1 | 71 | −3 |
| 27 | I | 1.0 | 0.5 | 107 | 7 | 74 | 2 |
| 28 | II | 0.0 | 1.5 | 100 | 0 | 105 | 0 |
| 29 | II | 0.5 | 1.0 | 100 | 1 | 112 | 6 |
| 30 | II | 1.0 | 0.5 | 105 | 7 | 123 | 16 |
| 31 | III | 0.0 | 1.5 | 100 | 0 | 103 | 0 |
| 32 | III | 0.5 | 1.0 | 110 | 10 | 115 | 12 |
| 33 | III | 1.0 | 0.5 | 115 | 15 | 127 | 24 |
| 34 | IV | 0.0 | 1.5 | 100 | 0 | 84 | 0 |
| 35 | IV | 0.5 | 1.0 | 103 | 3 | 88 | 5 |
| 36 | IV | 1.0 | 0.5 | 112 | 12 | 97 | 15 |

Various modifications and alterations that do not depart from the scope and spirit of this invention will become apparent to those skilled in the art. This invention is not to be duly limited to the illustrative embodiments set forth herein.

What is claimed is:

1. A method for preparing a tire tread, the method comprising forming a vulcanizable composition into a green tire tread and curing the green tire tread, the vulcanizable composition comprising:

a rubber component including a functionalized polymer; and a cure system, where the cure system includes sulfur and a disulfide compound represented by the formula:

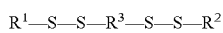

where $R^3$ represents a divalent organic group and $R^1$ and $R^2$ each independently include a monovalent organic group including a nitrogen atom.

2. The method of claim 1, where the disulfide compound is represented by the formula I-a

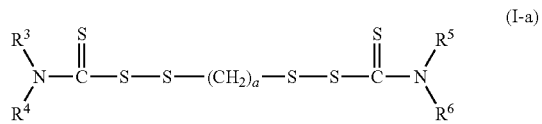

where $R^3$, $R^4$, $R^5$, and $R^6$ each independently represent a monovalent organic group, where at least one of $R^3$ and $R^4$ and at least one of $R^5$ and $R^6$ is an aromatic group, and n represents an integer from 2 to about 10.

3. The method of claim 2, where the disulfide compound is selected from the group consisting of 1,2-bis(N,N'-dibenzylthiocarbamoyldithio)ethane, 1,3-bis (N,N'-dibenzylthiocarbamoyl-dithio) propane, 1,4-bis (N,N'-dibenzylthiocarbamoyldithio) butane, 1, 5-bis (N,N'-dibenzylthiocarbamoyldithio) pentane, 1,6-bis (N,N'-dibenzylthio-carbamoyldithio) hexane, 1, 7-bis (N,N'-dibenzylthiocarbamoyldithio)-heptane, 1,8-bis (N,N'-dibenzylthiocarbainoyldithio) octane, 1,9-bis (N,N'-dibenzylthiocarbamoyldithio)nonane, and 1,10-bis (N,N'-dibenzyl-thiocarbamoyldithio)decane.

4. The method of claim 1, where the functionalized polymer is a functionalized elastomer.

5. The method of claim 4, where the functionalized elastomer includes at least one functional group including a heteroatom.

6. The method of claim 4, where the functionalized elastomer includes at least one functional group that reduces the 50° C. hysteresis loss of carbon-black filled vulcanizates prepared from the functionalized polymer as compared to similar carbon-black filled vulcanizates prepared with an unfunctionalized polymer.

7. The method of claim 6, where the reduction in 50° C. hysteresis loss is at least 5%.

8. The method of claim 4, where the functionalized elastomer is prepared by employing a coordination catalyst system.

9. The method of claim 8, were the coordination catalyst system is a lanthanide-based catalyst system.

10. The method of claim 9, where the functionalized elastomer includes at least one functional group at the terminal end of the polymer chain.

11. The method of claim 10, where the functional group is the result of a reaction between a pseudo-living polymer and a functionalizing agent.

12. The method of claim 11, where the elastomer is a high cis-polydiene.

13. The method of claim 12, where the high-cis polydiene is cis-1,4-poly(butadiene), cis-1,4-poly(isoprene), or cis-1,4-poly(butadiene-co-isoprene), where the cis-1,4-linkage is at least 80%.

14. The method of claim 4, where the functionalized elastomer is prepared by employing an anionic polymerization initiator.

15. The method of claim 14, where the functionalized elastomer includes at least one functional group at the terminal end of the polymer chain.

16. The method of claim 15, where the functional group is the result of a reaction between a pseudo-living polymer and a functionalizing agent.

17. The method of claim 16, where the functionalized elastomer includes at least two functional groups, where at least one functional group is located at the head of the polymer chain, which is the location where the initiator reacts or interacts with the first monomer polymerized.

18. The method of claim 17, where the at least one functional group located at the head of the polymer chain is the reaction residue of a functional initiator.

19. The method of claim 1, where the weight ratio of the sulfur to the disulfide is from about 2:1 to about 0.5:1.

20. The method of claim 1, where the weight ratio of the sulfur to the disulfide is from about 1.5:1 to about 0.7:1.

21. The method of claim 1, where the vulcanizable composition includes from about 0.5 to about 5 parts by weight of the cure system per 100 parts by weight of the rubber component.

22. The method of claim 1, where the vulcanizable composition includes from about 1 to about 4 parts by weight of the cure system per 100 parts by weight of the rubber component.

23. The method of claim 1, where the vulcanizable composition includes from about 1.5 to about 3 parts by weight of the cure system per 100 parts by weight of the rubber component.

24. The method of claim 1, where the rubber component further includes an unfunctionalized polymer.

25. The method of claim 24, where the unfunctionalized polymer is an unfunctionalized elastomer.

26. The method of claim 25, where the unfunctionalized elastomer is selected from the group consisting of natural rubber, synthetic poly(isoprene), poly(butadiene), poly (isobutylene-co-isoprene), neoprene, poly(ethylene-co-propylene), poly(styrene-co-butadiene), poly(styrene-co-isoprene), and poly(styrene-co-isoprene-co-butadiene), poly (isoprene-co-butadiene), poly(ethylene-co-propylene-co-diene), polysulfide rubber, acrylic rubber, urethane rubber, silicone rubber, epichlorohydrin rubber, and mixtures thereof.

27. The method of claim 25, where the rubber component includes at least 15% by weight of the functionalized polymer.

28. The method of claim 25, where the rubber component includes at least 20% by weight and up to 90% by weight of the functionalized elastomer.

29. The method of claim 1, where the vulcanizable composition further includes a filler.

30. The method of claim 29, where the filler includes carbon-black and optionally silica.

31. The method of claim 30, where the vulcanizable composition includes at least 20 parts by weight filler per 100 parts by weight of the rubber component.

32. The method of claim 31, where the vulcanizable composition includes at least 40 parts by weight and up to 120 parts by weight filler per 100 parts by weight of the rubber component.

33. The method of claim 25, where the unfunctionalized elastomer is selected from the group consisting of poly(isoprene), poly(butadiene), poly(isobutylene-co-isoprene), poly (styrene-co-butadiene), poly(styrene-co-isoprene), and poly (styrene-co-isoprene-co-butadiene), and poly(isoprene-co-butadiene).

34. The method of claim 4, where the functionalized elastomer includes a polymeric backbone selected from the group consisting of natural rubber, synthetic poly(isoprene), poly (butadiene), poly(isobutylene-co-isoprene), neoprene, poly (ethylene-co-propylene), poly(styrene-co-butadiene), poly (styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof.

35. The method of claim 1, where the functionalized polymer is defined by the formula:

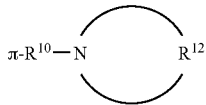

where $R^{10}$ and $R^{12}$ are each independently a divalent organic group, and $\pi$ is a polymer chain.

36. The method of claim 1, where the functionalized polymer is defined by the formula:

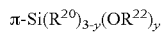

where each $R^{20}$ is independently a halogen or a monovalent organic group, each $R^{22}$ is independently a monovalent organic group, and y is an integer from 1 to 3.

37. The method of claim 1, where the functionalized polymer is defined by the formula:

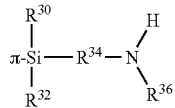

where $R^{30}$ includes a monovalent organic group or a hydrocarbyloxy group, $R^{32}$ includes a monovalent organic group, a hydroxy group, a halogen atom, or a hydrocarbyloxy group, where $R^{34}$ includes a covalent bond or a divalent organic group, and $R^{36}$ includes a hydrogen atom or a monovalent organic group, and where $\pi$ is a polymer chain.

38. A method comprising forming a vulcanizable composition into a tire component selected from the group consisting of treads, subtreads, sidewalls, body ply skins and bead fillers, and curing the tire component, wherein the vulcanizable composition comprises:

a rubber component including a functionalized polymer; and a cure system, where the cure system includes sulfur and a disulfide compound represented by the formula:

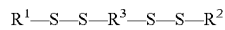

where $R^3$ represents a divalent organic group and $R^1$ and $R^2$ each independently include a monovalent organic group including a nitrogen atom.

39. A tire including a tire tread including the vulcanization residue of a functionalized polymer, sulfur, and a disulfide compound represented by the formula:

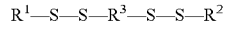

where $R^3$ represents a divalent organic group and $R^1$ and $R^2$ each independently include a monovalent organic group including a nitrogen atom.

40. A tire tread cured with sulfur and a disulfide compound represented by the formula:

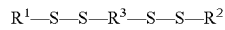

where $R^3$ represents a divalent organic group and $R^1$ and $R^2$ each independently include a monovalent organic group including a nitrogen atom, where the tire tread includes a functionalized polymer.

* * * * *